Patented Apr. 5, 1938

2,113,150

UNITED STATES PATENT OFFICE 2,113,150

OIL BLENDING AGENT

Peter J. Wiezevich, Elizabeth, N. J., now by judicial change of name Peter J. Gaylor, assignor to Standard Oil Development Company, a corporation of Delaware No Drawing. Application October 5, 1934, Serial No. 746,981

4 Claims. (Cl. 87—9)

This invention relates to oil blending agents, and especially to the addition of oil soluble aliphatic hydroxy amines to lubricants and other oils in order to improve their properties. This application contains subject matter disclosed and claimed in my applications Serial No. 178,559 filed December 7, 1937, and Serial No. 181,992 filed December 27, 1937.

Various amines have been described in the literature for reducing the oxidation rate of lubricating oils and similar substances. A large number of them, such as octadecylamine, triethylamine, amines prepared by reacting chlorinated wax with ammonia and the like have been found substantially inactive in this respect. Low molecular weight secondary and tertiary hydroxy amines, such as triethanolamine, possess some inhibiting properties, but they are not very effective. Furthermore, they are highly insoluble in mineral oils, making their use for this field out of question. A commercial triethanolamine giving similar results was found to contain 16% diethanolamine and 6% monoethanolamine. Many of the soluble amines also possess the undesirable property of increasing the sludging of lubricating oils.

The object of this invention is to employ superior blending agents which have not hitherto been available in large quantities and which may now be prepared by a simple process from cheap raw materials. These products do not have the above mentioned deleterious properties, and furthermore possess exceptionally good solubility and oxidation inhibiting and other properties, making them very suitable as addition agents to lubricants and similar products.

More specifically, the object of this invention is to employ as blending agents, oil soluble primary hydroxy amines, preferably those having more than 5 carbon atoms, and especially between 5 and 15 or more carbon atoms. It is preferable to employ those hydroxy amines which contain hydroxy and amino groups on adjacent carbon atoms, as exemplified by the formula:

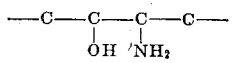

Another object of this invention is to prepare such products cheaply from paraffin wax or similar raw materials. In the preferred process, paraffin wax is cracked in liquid phase (although vapor phase cracking is not excluded), with or without pressure, and the cracked distillate boiling between 250–600° F. (averaging from 7 to 14.5 carbon atoms per molecule) is reacted with hypochlorous acid or urea chloride to produce the chlorhydrin. The latter product is then converted to the hydroxy amine by refluxing with aqueous ammonia or by heating at 50–200° C. under 3–50 or more atmospheres pressure with anhydrous ammonia. The bases are then recovered from the reaction mixture through their hydrochlorides.

Although pure hydroxy amine compounds of the nature specified may be employed, it is found more advantageous to use a series of compounds of varying molecular weight. This not only reduces the cost, but also gives more desirable results possibly due to the solubilizing action of the higher homologs on the lower ones. In many cases complete removal of the chlorhydrin is not necessary, and an amine product containing 0.1% to 1% or even 7% or more can be employed advantageously.

The following examples will illustrate the variety of phases involved in this invention:

Example 1

A cracked wax fraction boiling between 275–550° C. was treated with urea chloride and then with anhydrous ammonia at 50° C. under pressure. The hydroxy amines were recovered from the reaction mixture through their hydrochlorides, and a yield of 10% based on the cracked wax was obtained. These amines showed upon analysis, 1.69% nitrogen and 0.34% chlorine. 0.2% of these amines in a hydrogenated S. A. E. 50 oil considerably reduced the oxygen absorption rate at 200° C. The results obtained are as follows:

| Oil | Oxygen absorption cc. oxygen/10 cc. oil/15 min. intervals |
|---|---|
| S. A. E. 50 lubricating oil | 107–213 |
| Ditto + 0.2% hydroxy amines from cracked wax | 19-11-10-12 |

Example 2

The following data show that the addition of cracked wax hydroxy amines lowers considerably the oxygen absorption rate of a lubricating oil at 200° C. without deleteriously affecting the sludging properties, as shown by the Sligh test (Proc. A. S. T. M. 24, 964, II, (1924)):

| Oil | Oxygen absorption cc. oxygen/10 cc. oil/15 min. intervals | Sligh sludge, mgms. per 10 gms. |
|---|---|---|
| S. A. E. 50 lubricating oil | 132-116 | 5.5 |
| Ditto + 1.0% hydroxy amines | 11-34 | 5.6 |

Similar hydroxy amines may be prepared from pure olefins as well as from other materials such as cracked Montan wax, cracked hydrocarbon polymers, cracked petrolatum, cracked white oils, and the like, by known chemical processes. They may be added in concentrations of 0.01 to 1% to 5% or 10% or more. They may be used in conjunction with any or all of blending materials such as sludge dispersers, as for example the condensation product of chlorinated petrolatum and naphthalene, condensed diphenyl oxide, bright stocks and other residuals, etc., pour inhibitors, metallo-organic compounds, soaps, polymer thickeners capable of increasing the viscosity index of oils, dyes, oil soluble resins, oiliness agents, extreme pressure lubricating agents, sulfur compounds, oxidation inhibitors of the aromatic type, colloidal metals and the like.

The stocks in which these hydroxy amines may be added may be crude oils and their fractions or residuals, either in the natural state or partially or highly refined by chemicals, solvents, hydrogenation, and the like, flushing oils, greases, synthetic oils, fuels, solvents and the like. In many cases they may be added to fatty oils, ester lubricants, and similar oxygen containing materials.

Although I have shown and described certain specific embodiments of my invention, I am fully aware that many modifications thereof are possible. My invention, therefore, is not to be restricted except insofar as is necessitated by the prior art and by the spirit of the appended claims.

I claim:

1. An oil containing a small proportion of a soluble aliphatic primary hydroxy amine having more than 5 carbon atoms, said hydroxamine being capable of reducing the oxygen absorption rate without substantially increasing the sludging properties of the oil.

2. A lubricant comprising a mineral oil containing 0.01 to 5% of an anti-oxidant consisting of a soluble aliphatic hydroxy amine having 5 to 15 carbon atoms and a hydroxy and amino group, each on adjacent carbon atoms.

3. A lubricant according to claim 2 in which the hydroxy amine is prepared from cracked wax.

4. A lubricant according to claim 2 in which the hydroxy amine is present as a mixture of homologs of varying molecular weights.

PETER J. WIEZEVICH.